United States Patent [19]

Forte et al.

[11] Patent Number: 4,693,810
[45] Date of Patent: Sep. 15, 1987

[54] PROCESS FOR THE SEPARATION OF HYDROCARBONS FROM A MIXED FEEDSTOCK

[75] Inventors: Paulino Forte, Yonkers; Jose A. Vidueira, White Plains, both of N.Y.

[73] Assignee: Union Carbide Corporation, Danbury, Conn.

[21] Appl. No.: 741,830

[22] Filed: Jun. 6, 1985

[51] Int. Cl.⁴ .......................... C10G 7/00; B01D 3/38
[52] U.S. Cl. ..................... 208/321; 208/313
[58] Field of Search ............... 208/311, 313, 321, 353, 208/355, 356, 363, 366; 203/25, 27, 96, DIG. 14

[56] References Cited

U.S. PATENT DOCUMENTS

| | | | |
|---|---|---|---|
| 3,551,327 | 3/1969 | Kelly et al. | 208/321 X |
| 3,702,295 | 11/1972 | Thompson | 208/321 |
| 4,177,137 | 12/1979 | Kruse | 208/321 |
| 4,261,814 | 4/1981 | Pfeifer | 208/357 X |
| 4,390,418 | 6/1983 | Sherman | 208/321 X |
| 4,401,560 | 8/1983 | Viduelira et al. | 208/321 X |
| 4,415,443 | 11/1983 | Murphy | 208/355 |

Primary Examiner—Andrew H. Metz
Assistant Examiner—Glenn Caldarola
Attorney, Agent, or Firm—M. N. Reinisch

[57] ABSTRACT

In a solvent extraction/steam distillation process for the recovery of aromatic hydrocarbons wherein stripping water is obtained from the distillation column, the improvement comprising
(a) dividing the stripping water into two streams;
(b) passing one stream to a motive steam generator wherein the stripping water is vaporized and passed to a steam ejector;
(c) passing the other stream to a heat exchanger wherein the stripping water is vaporized by lean solvent from the distillation column, the lean solvent is cooled, and the stripping water vapor passes to the steam ejector;
(d) passing the stripping water vapor from steps (b) and (c) to the distillation column; and
(e) passing the lean solvent from step (c) to the extractor.

1 Claim, 1 Drawing Figure

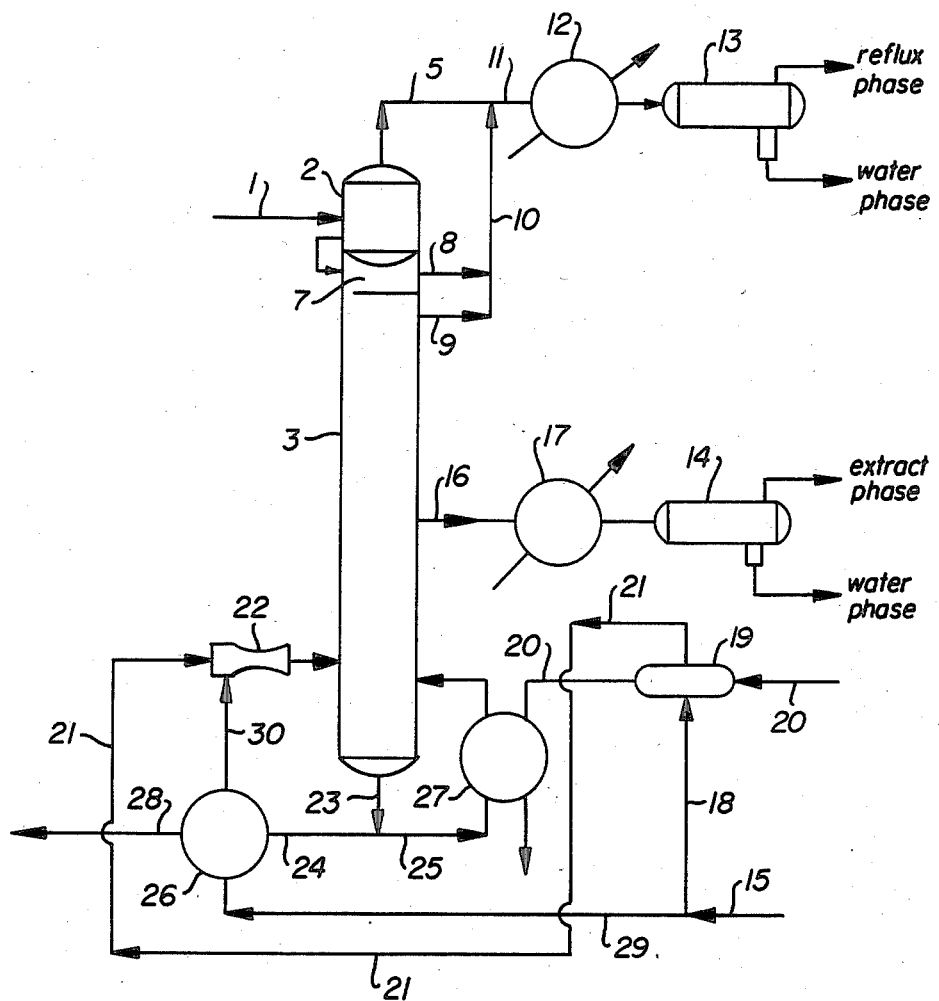

PROCESS FOR THE SEPARATION OF HYDROCARBONS FROM A MIXED FEEDSTOCK

TECHNICAL FIELD

This invention relates to a steam distillation process for the recovery of hydrocarbons from a mixed feedstock.

BACKGROUND ART

The benzene-toluene-$C_8$ aromatic fraction (known and hereinafter referred to as BTX) is now well established as a premier raw material in the manufacture of petrochemicals and as a desirable component in boosting octane ratings in gasoline. Many processes have been proposed for the separation of BTX, e.g., the process proposed in U.S. Pat. No. 3,714,033, which is incorporated by reference herein.

There is an industrial need for BTX, which is available in high proportion, e.g., greater than 30 percent by weight, in a wide variety of hydrocarbon feedstocks such as reformed gasolines; coke oven light oils; and cracked gasolines. These feedstocks also contain both aliphatic and cycloaliphatic hydrocarbons. Since the individual hydrocarbon compounds which make up these feedstocks are well known, they will not be discussed extensively; however, it can be pointed out that the major components of the feedstocks used herein are hydrocarbons with boiling points ranging from 25° C. to 175° C. including straight-chain and branched-chain paraffins and naphthenes, such as n-heptane, isooctane, and methyl cyclohexane, and aromatics such as BTX.

The BTX fraction can include benzene, toluene, the $C_8$ aromatics including ortho-xylene, meta-xylene, para-xylene, and ethyl benzene, and $C_9$ aromatics, which, if present at all, appear in the smallest proportion in relation to the other components.

The solvents used in solvent extraction/steam distillation (stripping) processes for the recovery of BTX are water-miscible organic liquids (at process temperatures) having a boiling point of at least about 200° C. and having a decomposition temperature of at least about 225° C. The term "water-miscible" includes those solvents which are completely miscible over a wide range of temperatures and those solvents which have a high partial miscibility at room temperature since the latter are usually completely miscible at process temperatures. The solvents are also polar and are generally comprised of carbon, hydrogen, and oxygen with some exceptions. Examples of solvents which may be used in the process of this invention are dipropylene glycol, tripropylene glycol, dibutylene glycol, tributylene glycol, ethylene glycol, diethylene glycol, ethylene glycol monomethyl ether, ethylene glycol monoethyl ether, diethylene glycol monomethyl ether, diethylene glycol monoethyl ether, sulfolane, N-methyl pyrrolidone, triethylene glycol, tetraethylene glycol, ethylene glycol diethyl ether, propylene glycol monoethyl ether, pentaethylene glycol, hexamethylene glycol, and mixtures thereof. The preferred group of solvents is the polyalkylene glycols and the preferred solvent is tetraethylene glycol.

Additional solvents, which may be used alone or together, or with the aforementioned solvents are amides such as formamide, acetamide, dimethylformamide, diethylformamide, and dimethylacetamide; amines such as diethylenetriamine and triethylenetetramine; alkanolamines such as monoethanolamine, diethanolamine, and triethanolamine; nitriles such as beta,beta[1]-oxydipionitrile and beta,beta[1]-thiodipropionitrile; phenol and the cresols; the methyl sulfolanes; sulfoxides such as dimethyl sulfoxide and diethyl sulfoxide; lactones such as gamma-propiolactone and gamma-butyrolactone.

The apparatus used in the process both for extraction and distillation is conventional, e.g., an extraction column of the multi-stage reciprocating type containing a plurality of perforated plates centrally mounted on a vertical shaft driven by a motor in an oscillatory manner can be used as well as columns containing pumps with settling zones, sieve trays with upcomers, or even a hollow tube while the distillation can be conducted in a packed, bubble plate, or sieve tray fractionating column. Counter-current flows are utilized in both extraction and distillation columns.

Heat exchangers, decanters, reservoirs, solvent regenerators, condensers, compressors, and pumps as well as various extractors other than the main extractor can also be used to complete the system. The other extractors are preferably single stage mixer-settlers, but can be any of the well known types. Again, all of this apparatus is conventional off-the-shelf equipment commonly used in extraction/distillation processes.

The solvent is used as an aqueous solution containing water in an amount of about 1 percent to about 10 percent by weight based on the weight of the solvent and preferably containing water in an amount of about 2 percent to about 6 percent by weight.

Generally, to accomplish the extraction, the ratio of solvent (exclusive of water) to feedstock in the extractor is in the range of about 4 to about 8 parts by weight of solvent to one part by weight of feedstock. This broad range can be expanded upon where nonpreferred solvents are used. A broad range of about 3 to about 12 parts by weight of solvent to one part by weight of feedstock and a preferred range of about 5 parts to about 7 parts of solvent per part of feedstock can be used successfully for the solvent of preference and other like solvents. In final analysis, however, the ratio is selected by the technician based on experience with the particular feedstock and depends in part upon whether high recovery or high purity is being emphasized.

The reflux to the extraction zone, an important part of the process, is generally made up of about 20 percent to about 50 percent by weight aliphatics having from 5 to 7 carbon atoms and about 50 percent to about 80 percent by weight aromatics, both based on the total weight of the reflux. The ratio of reflux to feedstock in the extraction zone is, generally, maintained in the range of about 0.5 to about 1.5 parts by weight of reflux to one part by weight of feedstock and preferably about 0.5 to about 1.0 part by weight of reflux to one part by weight of feedstock, but, again, is selected by the technician just as the ratio of solvent to feedstock. The reflux aliphatics pass into the extract rather than being taken overhead with the raffinate and are recycled to the extractor from the reflux decanter.

The temperature in the extraction zone is maintained in the range of about 100° C. to about 200° C. and is preferably in the range of about 125° C. to about 150° C., especially for the solvent of preference.

The pressure in the extraction zone is maintained in the range of about 75 psig to about 200 psig. As is well known in the art, however, one selected pressure is not maintained throughout the extraction zone, but, rather, a high pressure within the stated range is present at the bottom of the zone and a low pressure, again within the stated range, is present at the top of the zone with an intermediate pressure in the middle of the zone. The pressures in the zone depend on the design of the equipment and the temperature, both of which are adjusted to maintain the pressure within the stated range.

The temperature at the top of the distillation zone, which, in terms of the apparatus used, may be referred to as a distillation column or stripper, is at the boiling point of the mixture of aromatics present in the zone while the temperature at the bottom of the stripper is generally in the range of about 135° C. to about 200° C.

The pressure at the top of the stripper, an upper flash zone in this case, is in the range of about 20 psig to about 45 psig. In a lower flash zone just beneath the upper flash zone and connected thereto, the pressure is in the range of about zero psig to about 25 psig and is about 10 or 20 psig lower than the pressure in the upper flash zone. The pressure in the rest of the distillation zone is maintained in the range of about 5 psig to about 25 psig with some variation throughout the zone.

The steam or steam/water mixture brought into the bottom of the distillation zone enters at a temperature of about 100° C. to about 150° C. and is under a pressure of about 5 psig to about 25 psig. The total water and/or steam injected into the distillation column is in the range of about 0.1 part to about 0.5 part by weight of water to one part by weight of aromatics in the zone and preferably in the range of about 0.1 part to about 0.3 part by weight of water to one part by weight of aromatics. The water used for the stripping steam is usually called stripping water. The stripping water may or may not be recirculated throughout the process before being recycled to the distillation column. A small amount of water is present in liquid form in the distillation zone dissolved in the solvent.

Typically, in solvent extraction/steam distillation processes, the feedstock is preheated and then introduced to the main extractor at about the middle tray. An aqueous solvent solution (known as lean solvent) enters at the top tray of the extractor and percolates down the column removing aromatics from the feedstock. The raffinate, essentially free of aromatics, leaves the top of the column. Provisions are made for the recovery of solvent and any remaining aromatics from the raffinate as well as the water which is used to wash it. In the lower half of the extractor, the solvent solution of aromatics comes into countercurrent contact with a reflux liquid, which enters the extractor below the bottom tray. The reflux percolates up the lower half of the extractor progressively dissolving in and purifying the solvent solution of aromatics. The extract (known as rich solvent) leaves the bottom of the extractor and enters the stripper (or distillation zone) at an upper flash chamber. Part of the extract flashes on entering the flash chamber and is taken overhead in vapor form and the other part of the extract passes as a liquid into a lower flash chamber. Again, part of the extract, flashes overhead and the balance of the extract (at least about 80 percent by weight) percolates down the column into the fractionation zone where it comes into countercurrent contact with the stripping vapors, i.e., steam, and more vapors are generated. A part of the vapors rises to the top of the column where it mixes with flash vapors to form the overhead distillate. The overhead distillate provides reflux for the extractor. After the rich solvent descends about halfway down the column, it becomes essentially free of aliphatics. At this point, a vapor side-cut distillate (or extract) is removed. The side-cut distillate is separated into its aromatics and solvent/water components, the aromatics being recovered and the solvent and water being recycled into the system. Stripping water from the side-cut distillate and other water from the system is returned to the bottom of the stripper as steam or a steam/water mixture. The bulk of the solvent and water leaves the bottom of the stripper. A portion of this solution is directed to a reboiler where it is vaporized and then returned to a point below the bottom tray of the stripper to provide heat therefor. The balance of the solvent/water solution is recycled to the top tray of the main extractor.

There are many specific variations of the above process, each of which seeks either to reduce apparatus requirements, i.e., capital expenditure, or energy consumption, or make more effective use of process components while meeting purity specifications.

DISCLOSURE OF THE INVENTION

An objective of this invention is to reduce energy consumption with a nominal increase in capital expenditure.

Other objectives and advantages will become apparent hereinafter.

According to the invention, an improvement has been found in a solvent extraction/steam distillation process for the recovery of aromatic hydrocarbons wherein stripping water is obtained from the distillation column.

The improvement comprises (a) dividing the stripping water into two streams; (b) passing one stream to a motive steam generator wherein the stripping water is vaporized and passed to a steam ejector; (c) passing the other stream to a heat exchanger wherein the stripping water is vaporized by lean solvent from the distillation column, the lean solvent is cooled, and the stripping water vapor passes to the steam ejector; (d) passing the stripping water vapor from steps (b) and (c) to the distillation column; and (e) passing the lean solvent from step (c) to the extractor.

BRIEF DESCRIPTION OF THE DRAWING

The sole FIGURE is a schematic flow diagram of an illustrative embodiment of the subject invention.

DETAILED DESCRIPTION

The main extractor, feedstock, solvent, temperatures, and pressures are as described above except as noted.

Referring to the drawing:

The rich solvent from the extractor (not shown), at a temperature in the range of about 100° C. to about 150° C., passes along line 1 to primary flash chamber 2 at the top of stripper 3. Primary flash chamber 2 is maintained at a pressure in the range of about 20 pounds per square inch gauge (psig) to about 60 psig. Part of the hydrocarbon and water in the rich solvent is flashed overhead along line 5, at a temperature in the range of about 90° to about 140° C. and at a pressure in the range of about 15 psig to about 55 psig. The vapors proceed along line 5 where they meet vapors from secondary flash chamber 7 and the top of stripper 3 passing along lines 8 and 9, respectively, and combining into line 10. Streams 5 and 10 represent the overhead distillate. Those streams combine and enter stream 11, which is introduced into reflux condenser 12. The vapors are condensed in reflux condenser 12 and the liquid passes into decanter 13 where a hydrocarbon reflux phase is separated from a water phase. The reflux is recycled to the extractor and the water phase is combined with the water phase from decanter 14 and sent to line 15. The origin of the water phase in decanter 14 is the side cut distillate or extract which passes as a vapor through line 16 into extract condenser 17. The vapor is condensed and continues as a liquid into decanter 14. Here, the liquid is separated into an extract phase and a water phase. The extract or aromatics phase is recovered for further distillation and separation.

The combined water phases (which may also be referred to as stripping water) pass along line 15 to a point where the stream is divided into two streams. The first stream, which represents about 30 to 60 percent by weight of the line 15 stream, passes along line 18 to motive steam generator 19 where it is converted to high pressure motive steam with a temperature in the range of about 150° to about 230° C. and a pressure in the range of about 50 to about 400 psig. This is accomplished by introducing steam at a pressure in the range of about 125 to about 450 psig along line 20 into motive steam generator 19. The stripping water steam (as motive steam) from generator 19 then passes along line 21 to steam ejector 22, providing the driving force therefor. Suction steam at a temperature in the range of about 100° to about 125° C. and a pressure of about zero psig to about 20 psig enters steam ejector 22 along line 30 from heat exchanger 26. Steam ejector 22 pumps essentially all of the steam into the bottom of stripper 3. The temperature and pressure at the bottom of stripper 3 are, then, respectively, in the range of about 130° to about 150° C. and about 4 to about 25 psig. The steam then passes up the column to meet the rich solvent from the extractor as described above.

Lean solvent, at a temperature of about 120° to about 150° C., passes out of the bottom of stripper 3 through line 23. A portion of the lean solvent is sent to reboiler 27 along line 25 where it is heated to a temperature of about 120° to about 160° C. and returned to the bottom of stripper 3. The heat in reboiler 27 is provided by the steam passing through line 20. The balance of the lean solvent is sent through line 24 to heat exchanger 26 where it provides heat for the second stream and then passes along line 28 to the extractor at a temperature in the range of about 100° to about 135° C.

The second stream from the division of the line 15 stream follows line 29 to heat exchanger 26 where it is vaporized with hot lean solvent to provide suction steam, which passes along line 30 to steam ejector 22. The second stream represents about 40 to 70 percent by weight of the line 15 stream.

The scheme describe herein is most useful on units which are not able to vaporize all of the stripping water in heat exchanger 26. Here, part of the stripping water is used to generate motive steam in motive steam generator 19 with steam from line 20. Line 20 steam is also used in reboiler 27. The motive steam is used as the driving force in steam ejector 22, which pumps stripping water vapors into stripper 3 and lowers the pressure and boiling temperature of the stripping water in heat exchanger 26, increasing the amount of water vaporized. In doing so, more heat is extracted from the lean solvent passing through line 24 lowering its temperature. The cooler lean solvent, in turn, is much more selective for the aromatic fraction and, of course, less selective for the non-aromatic fraction. This causes a reduction in the reflux to feed ratio, and, consequently, a reduction in heat duty. The lower reflux to feed ratio can result in an increase in the recovery of aromatics, but, if this is not an objective, a reduction in solvent to feed ratio can be achieved.

The advantages of subject process are summarized as follows:

1. High energy savings. Further, the higher the stripping water rate used to strip the aromatics, i.e., the higher the aromatic content of the feed, the greater the energy savings obtained.

2. Low capital investment. The cost of the motive steam generator and the steam ejector is minor compared with the cost of compressors.

The invention is illustrated by the following example (percentages and ratios are by weight):

The process described above and in the drawing is carried out in the preferred mode. The feedstock is characterized as a a pyrolysis gasoline containing about 86.8 percent BTX.

The composition of the feed is as follows:

| Hydrocarbon | wt. % |
|---|---|
| Benzene | 51.51 |
| Toluene | 19.38 |
| Xylene | 12.10 |
| Cumene | 3.82 |
| n-Pentane | 1.22 |
| n-Hexane | 3.34 |
| n-Heptane | 0.40 |
| n-Octane | 0.26 |
| Cyclopentane | 1.40 |
| Cyclohexane | 1.76 |
| Methylcyclopentane | 3.56 |
| Methylcyclohexane | 1.25 |
| | 100.00% |

The lean solvent solution contains about 94 percent tetraethylene glycol and about 6 percent water.

The operating conditions and results are as follows:

| | |
|---|---|
| temperature of rich solvent entering stripper 3 | 93° C. |
| pressure in primary flash chamber | 30 psig |
| pressure in secondary flash chamber | 3 psig |
| temperature of secondary flash vapors | 83° C. |
| temperature of side-cut distillate (extract) vapors | 106° C. |
| pressure of side-cut distillate (extract) vapors | 5.3 psig |
| temperature in stripper 3 (bottom) | 135° C. |
| pressure in stripper 3 (bottom) | 6 psig |
| temperature of stripping water vapors from steam ejector | 113° C. |
| pressure of stripping water vapors from steam ejector | 8.5 psig |
| pressure of steam entering motive steam generator 19 | 200 psig |
| pressure of motive steam in line 21 | 150 psig |
| feedstock rate (pounds per hour) | 135,000 |
| solvent solution to feedstock ratio | 6.3 |
| reflux to feedstock ratio | 0.91 |
| stripping water rate (pounds per hour) | 43,129 |
| secondary flash vapors (pounds per hour) | 55.679 |
| side-cut distillate (extract hydrocarbons) vapors (pounds per hour) | 116,538 |
| raffinate rate (pounds per hour) | 18,484 |
| reflux rate (pounds per hour) | 122,806 |
| lean solvent rate (pounds per hour) | 850,740 |
| lean solvent temperature in line 23 | 135° |
| lean solvent temperature in line 28 | 106° C. |
| lean solvent water content (percent | 9.1 |

-continued

| | |
|---|---|
| by weight) | |
| stripping water vaporized in heat exchanger 26 (percent by weight) | 60 |
| stripping water to motive steam generator 19 (percent by weight) | 40 |
| Recoveries, i.e., percent of recovery based on amount in feedstock: | |
| benzene | 100.00 |
| toluene | 99.89 |
| xylene | 98.36 |
| cumene | 88.37 |
| impurities (parts per million by weight) | 998 |
| reboiler duty ($10^6$ BTU's per hour) | 95.6 |
| estimated energy saved ($10^6$ BTU's per hour) | 7.70 |
| estimated energy reduction (percent) | 7.5 |
| heat duty in BTU's per pound of BTX | 820 |

Note:

Energy savings and percentage reduction are based on a comparison with a process run using the same steps and conditions except that a motive system generator and steam ejector are not used. Instead only the rich solvent/stripping water heat exchanger is used to provide heat for the stripping water.

What is claimed is:

1. In a solvent extraction/steam distillation process for the recovery of aromatic hydrocarbons wherein stripping water is obtained from the distillation column, the improvement comprising
    (a) dividing the stripping water into two streams;
    (b) passing one stream to a motive steam generator wherein the stripping water is vaporized and passed to a steam ejector;
    (c) passing the other stream to a heat exchanger wherein the stripping water is vaporized by lean solvent from the distillation column, the lean solvent is cooled, and the stripping water vapor passes to the steam ejector;
    (d) passing the stripping water vapor from steps (b) and (c) to the distillation column; and
    (e) passing the lean solvent from step (c) to a solvent extractor.

* * * * *